US010097964B2

(12) United States Patent
Zhang et al.

(10) Patent No.: US 10,097,964 B2
(45) Date of Patent: Oct. 9, 2018

(54) MESSAGE BROADCASTING IN VANET

(71) Applicant: Harman International Industries, Incorporated, Stamford, CT (US)

(72) Inventors: Guoxia Zhang, Shanghai (CN); Qingshan Zhang, Shanghai (CN); Zeng Yang, Shanghai (CN); Jianjun Ma, Shanghai (CN)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 91 days.

(21) Appl. No.: 15/021,258

(22) PCT Filed: Sep. 24, 2013

(86) PCT No.: PCT/CN2013/084090
§ 371 (c)(1),
(2) Date: Mar. 10, 2016

(87) PCT Pub. No.: WO2015/042776
PCT Pub. Date: Apr. 2, 2015

(65) Prior Publication Data
US 2016/0227380 A1    Aug. 4, 2016

(51) Int. Cl.
*H04W 4/06* (2009.01)
*H04W 4/90* (2018.01)
(Continued)

(52) U.S. Cl.
CPC ............ *H04W 4/06* (2013.01); *H04W 4/046* (2013.01); *H04W 4/90* (2018.02); *H04W 76/40* (2018.02); *H04W 84/18* (2013.01); *H04W 4/02* (2013.01)

(58) Field of Classification Search
CPC ........... H04W 4/02; H04W 4/06; H04W 4/22; H04W 4/90; H04W 4/046; H04W 76/002; H04W 76/40; H04W 84/18; H04W 40/08
See application file for complete search history.

(56) References Cited

U.S. PATENT DOCUMENTS

2009/0122738 A1 * 5/2009 Chen ................... H04H 20/08
                                                              370/312
2009/0323579 A1 * 12/2009 Bai .......................... H04L 45/32
                                                              370/315

(Continued)

FOREIGN PATENT DOCUMENTS

CN    101977351 A    2/2011
CN    102256333 A    11/2011

(Continued)

OTHER PUBLICATIONS

International Search Report dated Jun. 23, 2014 in Application No. PCT/CN2013/084090.

(Continued)

*Primary Examiner* — Peter Chen
(74) *Attorney, Agent, or Firm* — Artegis Law Group, LLP

(57) ABSTRACT

A method for broadcasting a message in a vehicular ad hoc network and a vehicle mounted communication system are provided. The method may include: a first communication device mounted on a first vehicle receiving a message from a second vehicle; identifying a first number of vehicles which are within a communication range of the first communication device; calculating a first count-down time based on the first number, where the greater the first number the shorter the first count-down time; and if the first communication device does not receive the message again before the first count-down time ends, broadcasting the message when (Continued)

the first count-down time ends. The efficiency and reliability of message broadcasting may be improved.

14 Claims, 4 Drawing Sheets

(51) Int. Cl.
*H04W 4/02* (2018.01)
*H04W 76/40* (2018.01)
*H04W 84/02* (2009.01)
*H04W 4/04* (2009.01)
*H04W 84/18* (2009.01)

(56) References Cited

U.S. PATENT DOCUMENTS

2010/0060480 A1\* 3/2010 Bai .................. H04L 45/46
340/901
2012/0003921 A1\* 1/2012 Scopigno ............ G08G 1/161
455/3.01

FOREIGN PATENT DOCUMENTS

CN 103248672 A 8/2013
GB 2361794 A 10/2001

OTHER PUBLICATIONS

ALshaer et al., "An optimized adaptive broadcast scheme for Inter-vehicle communication", IEEE 61st Vehicular Technology Conference, May 30-Jun. 1, vol. 5, 2005, pp. 2840-2844.
Briesemeister et al., "Role-based multicast in highly mobile but sparsely connected ad hoc networks", Mobile and Ad Hoc Networking and Computing, 2000, Mobihoc, 2000 First Annual Workshop on Aug. 11, 2000, pp. 45-50.
Xiaomin Ma et al., "Design and Analysis of a Robusts Broadcast Scheme for Vanet Safety-Related Services", IEEE Transactions on Vehicular Technology, IEEE Service Center, vol. 61, No. 1, Jan. 1, 2012, pp. 46-61.
Extended European Search Report for Application No. 13894398.0 dated Feb. 22, 2017, 10 pages.

\* cited by examiner

MESSAGE BROADCASTING IN VANET

CROSS-REFERENCE TO RELATED APPLICATIONS

The present application is a national stage application of the international application titled, "MESSAGE BROADCASTING IN VANET," filed on Sep. 24, 2013 and having application number PCT/CN2013/084090. The subject matter of this related application is hereby incorporated herein by reference.

TECHNICAL FIELD

The present disclosure generally relates to message broadcasting in VANET.

BACKGROUND

In Vehicular Ad hoc Networks (VANETs), messages are generally delivered among vehicles by broadcasting. In conventional technologies, after a safety or emergency message, such as message about a traffic accident, is broadcasted by a vehicle, other vehicles which receive the message will continue to broadcast the message, and this may result in broadcast storm.

SUMMARY

In one embodiment, a method for broadcasting a message in a Vehicular Ad Hoc Network is provided. The method may include: a first communication device mounted on a first vehicle receiving a message from a second vehicle; identifying a first number of vehicles which are within a communication range of the first communication device; calculating a first count-down time based on the first number, where the greater the first number the shorter the first count-down time; and if the first communication device does not receive the message again before the first count-down time ends, broadcasting the message when the first count-down time ends.

In some embodiments, the first number of vehicles may be vehicles which are within the communication range of the first communication device and have not received the message. In some embodiments, whether a vehicle has received the message may be determined based on a beacon message received from the vehicle.

In some embodiments, the first number of vehicles may be vehicles which are within the communication range of the first communication device and out of a communication range of the second vehicle. In some embodiments, the vehicles within the communication range of the first communication device and out of the communication range of the second vehicle may be identified based on position information of the vehicles within the communication range of the first communication device and position information and power level information of the second vehicle.

In some embodiments, the position information of the vehicles within the communication range of the first communication device and the position information and power level information of the second vehicle may be obtained based on beacon messages received.

In some embodiments, the method may further include: determining whether the first communication device is out of a valid range of the message based on position information of the first vehicle and the valid range, where vehicles within the valid range are in need of the message and the valid range may be contained in the message; and if no, the first communication device identifying the first number of vehicles.

In some embodiments, the method may further include: determining whether a lifetime of the message is expired when it is received by the first communication device; and if no, the first communication device identifying the first number of vehicles.

In some embodiments, calculating the first count-down time may include: identifying a first group of vehicles which may be within both the communication range of the first communication device and the communication range of the second vehicle; obtaining a first set of numbers each of which indicates how many vehicles are within a communication range of a corresponding vehicle in the first group; sorting the first set of numbers together with the first number to obtain a number sequence; and calculating the first count-down time based on the position of the first number in the number sequence.

In some embodiments, the first communication device may obtain the first set of numbers based on beacon messages received from the first group of vehicles.

In some embodiments, if the first number equals to a number in the first set, their positions in the number sequence may be determined based on a distance between the first vehicle and the second vehicle, and a distance between the second vehicle and a vehicle corresponding to the number in the first set which equals to the first number.

In some embodiments, the method may further include: identifying, after the first communication device receives the message from a vehicle other than the second vehicle, a second number of vehicles which are within the communication range of the first communication device and have not received the message; calculating a second count-down time based on the second number if the second number doesn't equal to zero, where the greater the second number the shorter the second count-down time; and if not all the second number of vehicles receive the message before the second count-down time ends, broadcasting the message when the second count-down time ends.

In one embodiment, a method for broadcasting a message in a Vehicular Ad Hoc Network is provided. The method may include: after a message is received by a first communication device mounted on a first vehicle, the first communication device identifying a number of vehicles which are within a communication range of the first communication device and have not received the message; calculating a count-down time based on the number if the number doesn't equal to zero, where the greater the number the shorter the count-down time; and if not all the number of vehicles receive the message before the count-down time ends, broadcasting the message when the count-down time ends.

In some embodiments, the method may further include: repeating the method until all vehicles within the communication range of the first communication device have received the message.

In one embodiment, a vehicle mounted communication system is provided. The communication system may include a receiver, a transmitter and a processing device configured to: after the receiver receives a message from a first vehicle, identify a first number of vehicles which are within a communication range of the communication system; calculate a first count-down time based on the first number, where the greater the first number the shorter the first count-down time; and if the message is not received by the receiver again before the first count-down time ends, control the transmitter to broadcast the message when the first count-down time ends.

In some embodiments, the first number of vehicles may be vehicles which are within the communication range of the communication system and have not received the message. In some embodiments, the processing device may determine whether a vehicle has received the message based on a beacon message received from the vehicle.

In some embodiments, the first number of vehicles may be vehicles which are within the communication range of the communication system and out of a communication range of the first vehicle. In some embodiments, the processing device may identify the vehicles within the communication range of the communication system and out of the communication range of the first vehicle based on position information of the vehicles within the communication range of the communication system and position information and power level information of the first vehicle.

In some embodiments, the processing device may obtain the position information of the vehicles within the communication range of the communication system and the position information and power level information of the first vehicle based on beacon messages received by the receiver.

In some embodiments, the processing device may be further configured to: determine whether the communication system is out of a valid range of the message based on position information of the communication system and the valid range, where vehicles within the valid range are in need of the message and the valid range may be contained in the message; and if no, identify the first number of vehicles.

In some embodiments, the processing device may be further configured to: determine whether a lifetime of the message is expired when it is received by the receiver; and if no, identify the first number of vehicles.

In some embodiments, the processing device may be further configured to: identify a first group of vehicles which may be within both the communication range of the communication system and the communication range of the first vehicle; obtain a first set of numbers each of which indicates how many vehicles are within a communication range of a corresponding vehicle in the first group; sort the first set of numbers together with the first number to obtain a number sequence; and calculate the first count-down time based on the position of the first number in the number sequence.

In some embodiments, the processing device may be configured to obtain the first set of numbers based on beacon messages received from the first group of vehicles.

In some embodiments, the processing device may be further configured to: if the first number equals to a number in the first set, determine their positions in the number sequence based on a distance between the communication system and the first vehicle, and a distance between the first vehicle and a vehicle corresponding to the number in the first set which equals to the first number.

In some embodiments, the processing device may be further configured to: identify, after the receiver receives the message from a vehicle other than the first vehicle, a second number of vehicles which are within the communication range of the communication system and have not received the message; calculate a second count-down time based on the second number if the second number doesn't equal to zero, where the greater the second number the shorter the second count-down time; and if not all the second number of vehicles receive the message before the second count-down time ends, control the transmitter to broadcast the message when the second count-down time ends.

In one embodiment, a vehicle mounted communication system is provided. The communication system may include a receiver, a transmitter and a processing device configured to: after the receiver receives a message, identify a number of vehicles which are within a communication range of the communication system and have not received the message; calculate a count-down time based on the number if the number doesn't equal to zero, where the greater the number the shorter the count-down time; and if not all the number of vehicles receive the message before the count-down time ends, control the transmitter to broadcast the message when the count-down time ends.

In some embodiments, the processing device may be further configured to: repeat the above processes until all vehicles within the communication range of the communication system have received the message.

In one embodiment, a communication system is provided. The communication system may include: means for receiving a message from a first vehicle; means for identifying a first number of vehicles which are within a communication range of the communication system; means for calculating a first count-down time based on the first number, where the greater the first number the shorter the first count-down time; and means for broadcasting the message when the first count-down time ends, if the communication system does not receive the message again before the first count-down time ends.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Figure 1:
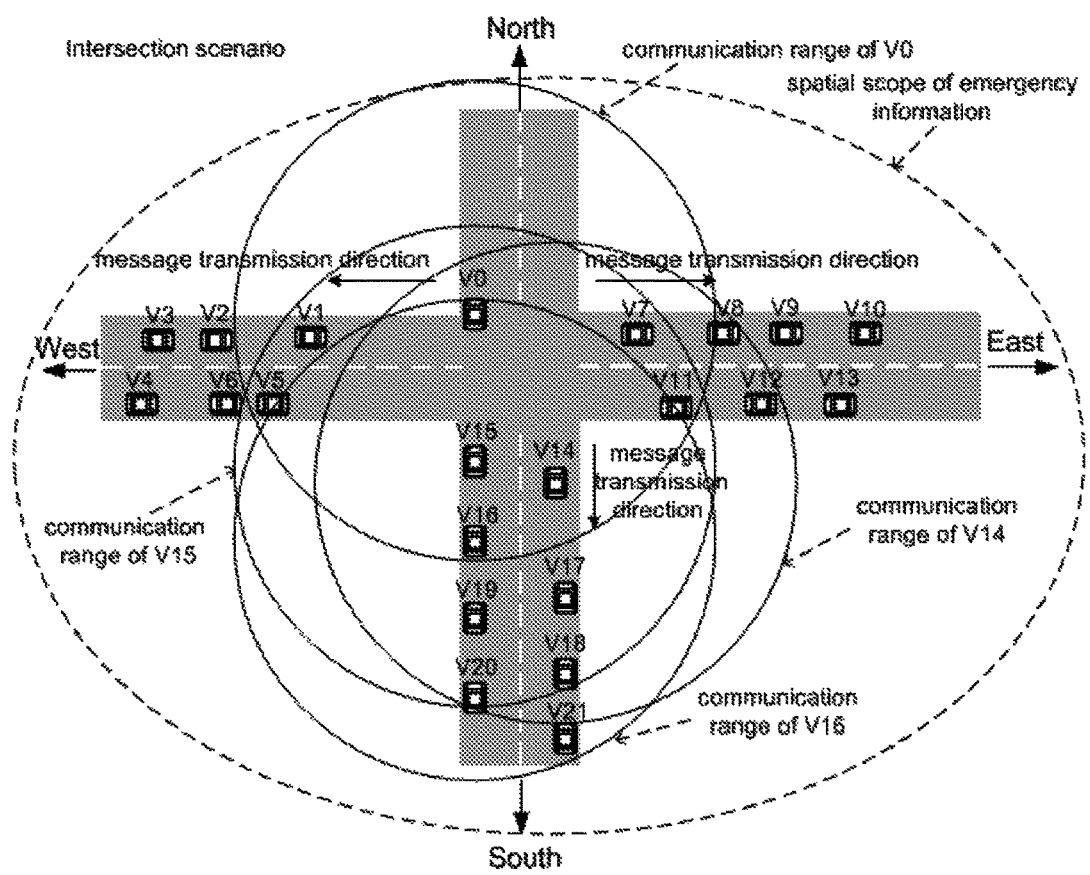
FIG. 1 schematically illustrates an example of a Vehicular Ad Hoc Network (VANET) in an intersection scenario according to one embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

In conventional technologies, after a safety or emergency message is broadcasted by a vehicle, other vehicles which receive the message will relay the message, and this may result in a broadcast storm.

FIG. 1 schematically illustrates an example of a Vehicular Ad hoc Network (VANET) in an intersection scenario according to one embodiment, which is a typical scenario in reality.

As shown in FIG. 1, vehicles V0 to V21 are disposed within the VANET. In FIG. 1, an ellipse marked in dotted lines may represent a spatial scope of an emergency message. Circles marked in solid line may represent communication ranges of the vehicles, where a vehicle may be a center of a corresponding circle representing its communication range. In FIG. 1, communication ranges of vehicles V0, V14, V15 and V16 are illustrated. The communication range of a vehicle may represent the farthest distance to which the vehicle can transmit a message, and/or the farthest distance from which the vehicle can receive a message. In some embodiments, it may be supposed that different vehicles have substantially the same communication range.

Assuming each of the vehicles V0 to V21 is equipped with a radio frequency (RF) transmission and reception device, such that the plurality of vehicles can periodically update and transmit their local topology information in messages called "beacons". If a vehicle (receiver) can receive a beacon from another vehicle (transmitter), the receiver may take the transmitter as a neighboring vehicle and add ID of the transmitter into a neighbor list thereof. Generally, a beacon message of a vehicle may contain ID of the vehicle, a number of neighboring vehicles of the vehicle, IDs of messages received by the vehicle, and a power level of the vehicle for transmitting a message, etc. In a VANET, vehicles may exchange beacon messages periodically to obtain information relating to their neighboring vehicles. Further, each vehicle may maintain a neighbor list which lists IDs and geographical coordinates of neighboring vehicles thereof. In some embodiments, a neighbor list of a vehicle may be updated according to beacon messages received by the vehicle.

Emergency messages are important for vehicles. Generally, an emergency message may have two parameters, a spatial scope and a temporal scope. The spatial scope indicates a geographical range within which the emergency message is effective and the temporal scope indicates a lifetime of the emergency message. A source vehicle may generate an emergency message carrying emergency information, a position of the source vehicle, a time point when the emergency message is to be broadcasted by the source vehicle, and a spatial scope and a temporal scope of the emergency message, and then the source vehicle may broadcast the emergency message. When a vehicle receives the emergency message, an acknowledgement of the emergency message may be added in a beacon message of the vehicle to be sent later. The vehicle may further determine whether the emergency message is relevant to itself based on the position of the source vehicle, the time point when the emergency message is broadcasted by the source vehicle, and the spatial scope and the temporal scope of the emergency message, which are contained in the emergency message. Once a vehicle receives the emergency message, it may update the emergency message to include its own ID and then broadcast the updated emergency message. Therefore, when another vehicle receives the updated emergency message, it may recognize from whom the updated emergency message is received.

Figure 2:
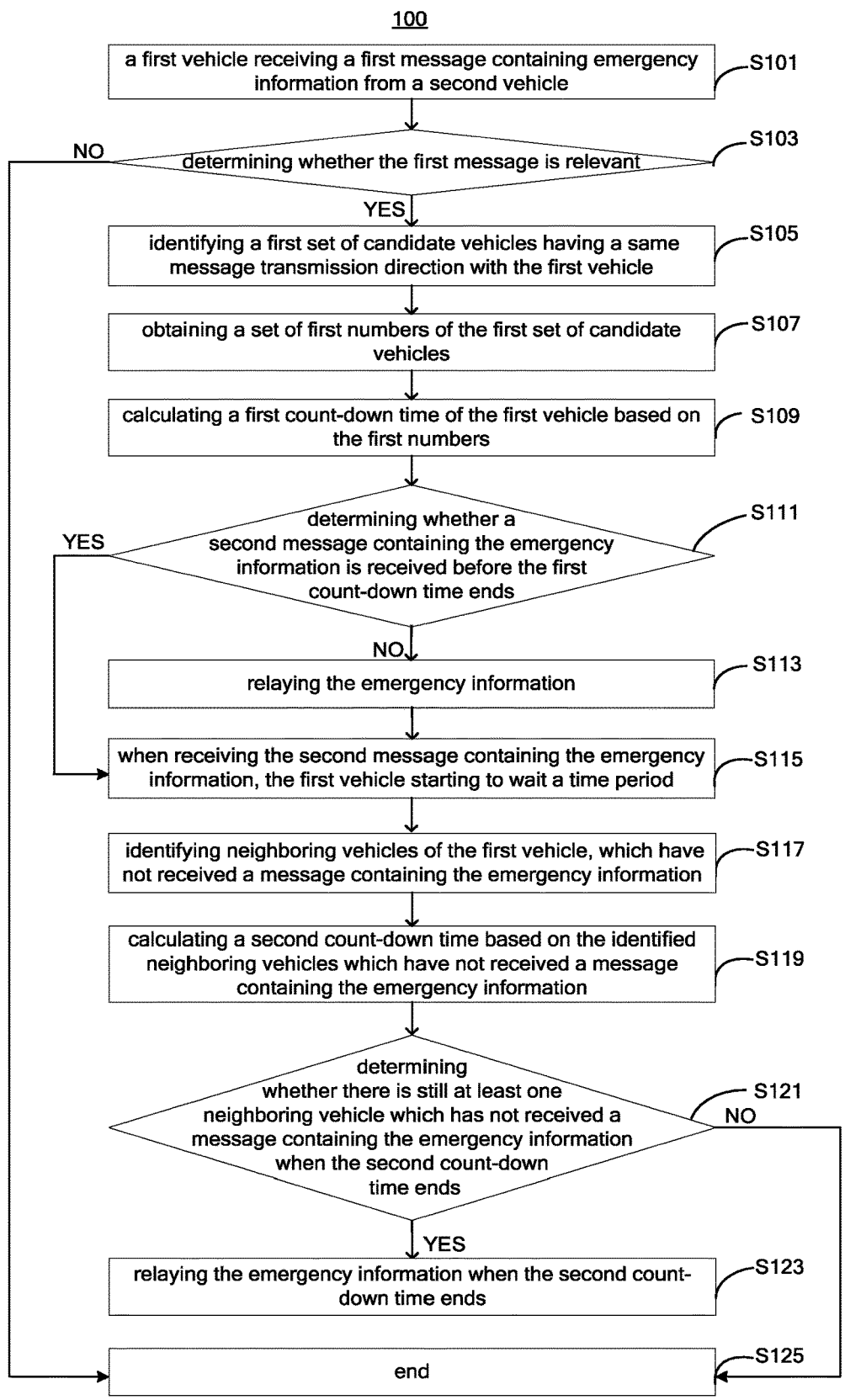
FIG. 2 schematically illustrates a flow chart of a method 100 for broadcasting an emergency message in a VANET according to one embodiment.

FIG. 2 schematically illustrates a flow chart of a method 100 for broadcasting an emergency message in a VANET according to one embodiment.

Referring to FIG. 2, in S101, a first vehicle receiving a first message containing emergency information from a second vehicle.

In some embodiments, the first message may be a safety or emergency message, such as a message about a traffic accident which occurred around. The first vehicle may receive the emergency information from the second vehicle in a first hop or other hops.

In some embodiments, the first message may further contain a position of the second vehicle, a time point when the first message is broadcasted by the second vehicle, and a spatial scope and a temporal scope of the emergency information contained therein.

Referring to FIG. 1, the vehicle V0 may know an accident earliest and broadcast a first message containing information about the accident. Vehicles V1, V5, V7, V11, V14, V15 and V16 are in a communication range of the vehicle V0, so they can receive the first message. Hereunder, V15 may be taken as the first vehicle and V0 may be taken as the second vehicle for illustration.

In S103, determining whether the first message is relevant.

As described above, an emergency message may have two parameters, spatial scope and temporal scope. In some embodiments, after receiving the first message, the first vehicle may determine whether the first message is relevant to itself based on the two parameters, the position of the second vehicle and the time point when the first message is broadcasted by the second vehicle. The position of the second vehicle and the spatial scope of the emergency information may determine a coverage of the emergency information in the first message. The time point when the first message is broadcasted by the second vehicle and the temporal scope of the emergency information may determine a lifetime of the emergency information in the first message. If a position of the first vehicle is determined out of the coverage of the emergency information, the first vehicle may discard the first message. If the lifetime of the emergency information is expired when it is received by the first vehicle, the first vehicle may discard the first message as well. If the position of the first vehicle is within the coverage of the emergency information and the lifetime of the emergency information is not expired when it is received by the first vehicle, which means the first message is relevant to the first vehicle, the first vehicle may prepare to relay the emergency information.

If the first vehicle V15 determines that the first message is relevant to itself, the process proceeds to S105, if no, proceeds to S125. In S125, the process may end. Broadcasting the emergency information may terminate. A similar broadcasting process may restart when another message carrying another piece of emergency information is received. Similar determinations may be implemented for vehicles V1, V5, V7, V11, V14 and V16 which may also receive the first message from the vehicle V0.

In S105, identifying a first set of candidate vehicles having a same message transmission direction with the first vehicle.

Messages may need to be spread along different directions. Referring to FIG. 1, the first message transmitted from the vehicle V0 may need to be spread along four directions, east, west, south and north. Candidate vehicles may include vehicles which have received the first message from the second vehicle and are prepared to broadcast the first message. Candidate vehicles in the same message transmission direction may have large overlapping regions within their communication ranges. For example, V14, V15 and V16, which are all in the communication range of the vehicle V0 and all in the south message transmission direction, may have many shared neighboring vehicles. If all vehicles in the same message transmission directions broadcast the first message, it may extremely waste communication resources.

In some embodiments, the first vehicle may identify the candidate vehicles based on the position and a power level of the second vehicle, and positions of its neighboring vehicles. If a neighboring vehicle of the first vehicle is determined to be in the communication range of the second vehicle, it may be concluded that this neighboring vehicle may have received the first message from the second vehicle. Further, the first vehicle may determine whether the neighboring vehicle is in the same message transmission direction as itself based on the position of itself, positions of the second vehicle and the neighboring vehicle, and the spatial scope of the emergency information. How to determine a message transmission direction is well known in the art. The neighboring vehicle may be determined to be a member of the first set of candidate vehicles if it is determined to be in the same message transmission direction as the first vehicle. It should be noted that the first set of candidate vehicles may include the first vehicle.

Figure 3:
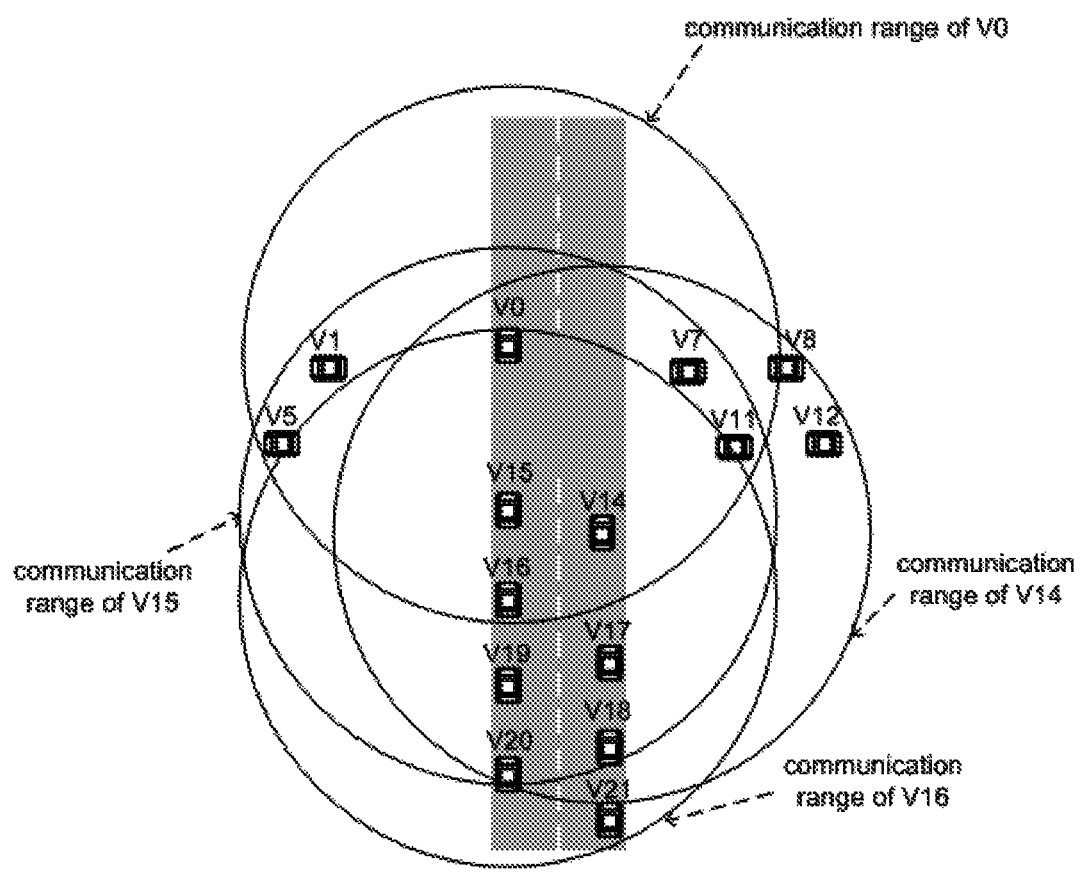
FIG. 3 schematically illustrates a partially enlarged view of a south portion of the VANET in the intersection scenario in FIG. 1.

FIG. 3 schematically illustrates a partially enlarged view of a south portion of the VANET in the intersection scenario in FIG. 1. Message broadcasting among vehicles in such portion, including the first vehicle V15, will be illustrated in detail hereinafter.

In S107, obtaining a set of first numbers of the first set of candidate vehicles.

Each of the first numbers may represent how many vehicles can receive the emergency message from a corresponding candidate vehicle in a next hop. To spread the emergency message as fast as possible and reduce the channel load, it would be better to let a candidate vehicle with the largest first number broadcast the emergency message as soon as possible.

In some embodiments, the first number of a candidate vehicle may equal to a number of vehicles in the neighbor list of the candidate vehicle. Therefore, the candidate vehicle may obtain its first number based on its neighbor list. As described above, a beacon message of a vehicle may contain the number of neighboring vehicles of the vehicle. Thus, the first vehicle may obtain the first numbers of other candidate vehicles through beacon messages received from the other candidate vehicles.

For the first vehicle V15, vehicles V0, V1, V5, V7, V11, and V14 to V20 are within its communication range, thus, the first number of the first vehicle V15 is 12. The first numbers of the candidate vehicles V14 and V16 may be 12 and 9, respectively.

In some embodiments, the first number of a candidate vehicle may equal to a number of neighboring vehicles which are in the same message transmission direction of the candidate vehicle. Neighboring vehicles in another message transmission direction may probably receive the emergency message from other vehicles which have received the emergency message and are in the same message transmission direction. Such configuration may accelerate the message spread in the south direction as shown in FIG. 3. Specifically, the first number of the first vehicle V15 may be 4, the first number of the candidate vehicle V14 may be 4, and the first number of the candidate vehicle V16 may be 5.

In S109, calculating a first count-down time of the first vehicle based on the first numbers.

The greater the first number of the first vehicle is, the shorter the first count-down time of the first vehicle may be. Therefore, it can be ensured that more vehicles may receive the emergency message in the next hop without occupying too much channel resource.

In some embodiments, the first vehicle may sort the first set of candidate vehicles into a sequence based on their first numbers. Thereafter, the first vehicle may calculate the first count-down time based on a position of itself in the sorted sequence.

In some embodiments, if two vehicles have the same first numbers, their first count-down time may be further calculated according to their relative distances to the second vehicle. In some embodiments, the longer the relative distance is, the shorter the first count-down time is.

Specifically, referring to FIG. 3, the first set of candidate vehicles V14, V15 and V16 may be sorted based on their first numbers. A set S may be established to list the sorted vehicles V14, V15 and V16. The vehicle having the greatest first number may be the first element in the set S. Since the vehicles V14 and V15 have the same first number, they are sorted again according to their relative distances to the vehicle V0. Therefore, the sorted set S may be obtained as {V14, V15, V16}. Hereafter, a first count-down time may be calculated according to the sorted set S. A vehicle listed in the front of the sorted set S may have a shorter first count-down time. Denoting the sequence number of a vehicle in the sorted set S as i, i may range from 0 to 2. In some embodiments, the first count-down time may be calculated based on following equation:

$$T = t * i$$

where T represents the first count-down time, i represents a sequence number of the first vehicle in the sorted set S, and t represents an approximate slot time taken for a message to be fully sent out, namely, a size of the emergency message divided by a network transmission rate.

Referring to FIG. 3, in the first set of candidate vehicles including V14, V15 and V16, since V14 has the greatest first number, it may have the shortest count-down time, namely, the vehicle V14 may relay the first message earlier than V15 and V16. The sequence number of the vehicle V14 is zero, thus, the first message containing the emergency information may be relayed as soon as possible. The sequence number of the first vehicle V15 is 1, so the first count-down time of the first vehicle V15 is t. It should be noted that, when relaying the first message, the vehicle 14 may change an ID of a vehicle sending the first message therein into its own to form a second message containing the emergency information and broadcasting the second message.

In some embodiments, the first count-down time may be calculated based on a function which makes the first count-down time negatively relevant to the first number of the first vehicle. Other vehicles may calculate their own count-down times in a similar way. In some embodiments, the first number of the first vehicle may equal to a number of vehicles which are in the communication range of the first vehicle and out of the communication range of the second vehicle.

In S111, determining whether a second message containing the emergency information is received before the first count-down time ends.

If a second message containing the emergency information is not received by the first vehicle before the first count-down time ends, the method proceeds to S113, relaying the emergency information; otherwise, the method goes to S115.

For example, if the first vehicle V15 receives the second message containing the emergency information from the vehicle V14 before the first count-down ends, the first vehicle V15 may not relay the emergency information when the first count-down ends; if not, the first vehicle V15 may relay the emergency information when the first count-down time ends.

In S115, when receiving the second message containing the emergency information, the first vehicle starting to wait a time period.

It should be noted that, when a vehicle broadcasts a message, the vehicle may receive the message by itself. Therefore, if the first vehicle broadcasts the emergency information before the first count-down time ends, the second message will be received by the first vehicle itself.

The time period may be established for waiting acknowledgements of receiving the emergency information, which acknowledges may be contained in beacon messages from neighboring vehicles. In some embodiments, the time period may be equal to a count-down time of a candidate vehicle having the smallest first number, i.e., the longest count-down time.

For example, in FIG. 3, upon receiving the second message containing the emergency information, either from itself or another vehicle, the first vehicle V15 may start to wait a time period 2t.

In S117, identifying neighboring vehicles of the first vehicle, which have not received a message containing the emergency information.

As described above, an acknowledgement of having received the emergency information may be contained in a beacon message received from neighboring vehicles. Therefore, the first vehicle may identify which neighboring vehicles have not received the emergency information.

Specifically, after the end of the time period 2t, the first vehicle V15 may generate a list listing the identified neighboring vehicles which have not received a message containing the emergency information.

In S119, calculating a second count-down time based on the identified neighboring vehicles which have not received a message containing the emergency information.

In some embodiments, the second count-down time may be calculated based on the list listing the identified neighboring vehicles. In some embodiments, the second count-down time may be negatively correlated to the number of vehicles in the list. That is, the greater the number of vehicles in the list is, the shorter the second count-down time is. In some embodiments, the second count-down time may be inversely proportional to the number of vehicles in the list.

If there is no vehicle in the list, the first vehicle doesn't calculate the second count-down time.

In S121, determining whether there is still at least one neighboring vehicle which has not received a message containing the emergency information when the second count-down time ends.

In some embodiments, before the second count-down time ends, the list may be updated each time based on received beacon messages with the acknowledgements. When the second count-down time ends, the first vehicle may determine whether the list has at least one vehicle therein.

If the list has at least one vehicle therein when the second count-down time ends, the method goes to S123; otherwise, the method goes to S125.

In S123, relaying the emergency information when the second count-down time ends.

After relaying the emergency information, the first vehicle may determine whether the list has at least one vehicle therein, again. If yes, the first vehicle may jump to perform S119; if no, the first vehicle may stop message broadcasting.

By using the method described above, a part of vehicles in the network which have received the emergency information may not have to relay the emergency information, which reduces the transmission redundancy and avoids channel congestion. Furthermore, a vehicle which may transmit the emergency information to more receivers may be determined to relay the emergency information more quickly, which facilitates the emergency information being spread out as soon as possible and ensures a low transmission delay. Besides, the emergency information may be received by almost all the relevant vehicles through checking neighboring vehicles, which improves the reliability of message broadcasting.

Figure 4:
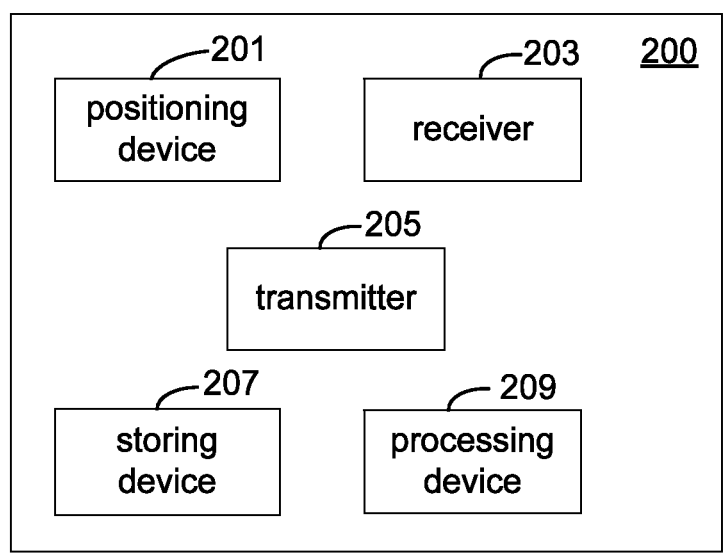
FIG. 4 schematically illustrates a vehicle mounted communication system 200 in a VANET according to one embodiment.

Referring to FIG. 4, a vehicle mounted communication system 200 is provided according to one embodiment. The communication system 200 may be mounted on a vehicle. Referring to FIG. 4, the communication system 200 may include a positioning device 201, a receiver 203, a transmitter 205, a storing device 207 and a processing device 209.

The positioning device 201 may be configured to obtain geographical coordinates of the vehicle, i.e., the geographical coordinates of the communication system 200. The receiver 203 may be configured to receive messages. The transmitter 205 may be configured to broadcast messages. In some embodiments, the positioning device 201, the receiver 203 and the transmitter 205 may be contained in a GPS device. The storing device 207 may be configured to store a neighbor list of the vehicle and a list of neighboring vehicles which haven't received a message containing the emergency information. In some embodiments, the processing device 209 may be a CPU, a DSP, an MCU etc, or any combination thereof.

The processing device 209 may be configured to: after the receiver 203 receives a first message containing emergency information from a first vehicle, determine whether the first message is relevant; identify a first set of candidate vehicles having a same message transmission direction with the communication system; obtain a set of first numbers of the first set of candidate vehicles; calculate a first count-down time of the communication system based on the first numbers; determine whether a second message containing the emergency information is received by the receiver 203 before the first count-down time ends; if the second message containing the emergency information is not received by the receiver 203 before the first count-down time ends, control the transmitter 205 to relay the emergency information when the first count-down time ends; start to wait a time period when the receiver 203 receives the second message containing the emergency information; identify neighboring vehicles of the communication system which have not received a message containing the emergency information; calculate a second count-down time based on the identified neighboring vehicles which have not received a message containing the emergency information; determine whether there is still at least one neighboring vehicle which has not received a message containing the emergency information when the second count-down time ends; control the transmitter 205 to relay the emergency information when the second count-down time ends, if there is at least one neighboring vehicle which has not received a message containing the emergency information; and stop message broadcasting if all the identified neighboring vehicles have received a message containing the emergency information.

According to one embodiment of the present disclosure, a computer readable medium, which contains a computer program for broadcasting a message in a VANET, is provided. When the computer program is executed by a processor, it will instruct the processor to: receive a message from a first vehicle; identify a first number of vehicles which are within a communication range of the processor; calculate a first count-down time based on the first number, where the greater the first number the shorter the first count-down time; and if the processor does not receive the message again before the first count-down time ends, broadcast the message when the first count-down time ends.

By using the method and system according to above embodiments, the delay of message broadcasting may be reduced, and the efficiency and reliability of message broadcasting may be improved.

There is little distinction left between hardware and software implementations of aspects of systems; the use of hardware or software is generally a design choice representing cost vs. efficiency tradeoffs. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method for broadcasting a message in a vehicular ad hoc network, comprising:
   receiving the message at a first communication device mounted on a first vehicle that is transmitted from a second vehicle;
   identifying a first number of vehicles that are within a communication range of the first communication device;
   calculating a first count-down time based on the first number of vehicles, where the first count-down time decreases as the first number of vehicles increases; and
   if the first communication device does not receive the message again before the first count-down time ends, broadcasting the message when the first count-down time ends.

2. The method according to claim 1, wherein the first number of vehicles are out of a communication range of the second vehicle.

3. The method according to claim 1, further comprising determining that the first communication device is not out of a valid range of the message.

4. The method according to claim 1, further comprising determining that a lifetime of the message has not expired when the message is received at the first communication device.

5. The method according to claim 1, wherein calculating the first count-down time comprises:
   identifying a first group of vehicles that are within both the communication range of the first communication device and a communication range of the second vehicle;
   obtaining a first set of numbers, wherein each number indicates how many vehicles are within a communication range of a corresponding vehicle included in the first group;
   sorting the first set of numbers together with the first number of vehicles to obtain a number sequence; and
   calculating the first count-down time based on a position of the first number in the number sequence.

6. The method according to claim 5, wherein the first number of vehicles is equal to a number included in the first set of numbers, and further comprising determining a position of the first number of vehicles in the number sequence and a position of the number included in the first set of numbers in the number sequence based on a distance between the first vehicle and the second vehicle and a distance between the second vehicle and a vehicle corresponding to the number included in the first set of numbers that is equal to the first number of vehicles.

7. The method according to claim 1, further comprising:
   identifying, after the first communication device receives the message from a vehicle other than the second vehicle, a second number of vehicles which are within the communication range of the first communication device and have not received the message;
   calculating a second count-down time based on the second number if the second number doesn't equal to zero, where the greater the second number the shorter the second count-down time; and
   if not all the second number of vehicles receive the message before the second count-down time ends, broadcasting the message when the second count-down time ends.

8. A vehicle mounted communication system, the communication system comprising:
   a receiver and a transmitter; and
   a processing device configured to:
      after the receiver receives a message from a first vehicle, identify a first number of vehicles that are within a communication range of the communication system;
      calculate a first count-down time based on the first number of vehicles, where the first count-down time decreases as the first number of vehicles increases; and
      if the message is not received by the receiver again before the first count-down time ends, control the transmitter to broadcast the message when the first count-down time ends.

9. The vehicle mounted communication system according to claim 8, wherein the first number of vehicles are out of a communication range of the first vehicle.

10. The vehicle mounted communication system according to claim 8, wherein the processing device is further configured to determine that the system is not out of a valid range of the message based on position information of the system.

11. The vehicle mounted communication system according to claim 8, wherein the processing device is further configured to determine that a lifetime of the message has not expired when the message is received by the receiver.

12. The vehicle mounted communication system according to claim 8, wherein the processing device is further configured to:

identify a first group of vehicles that are within both the communication range of the communication system and the communication range of the first vehicle;

obtain a first set of numbers, wherein each number indicates how many vehicles are within a communication range of a corresponding vehicle included in the first group;

sort the first set of numbers together with the first number of vehicles to obtain a number sequence; and calculate the first count-down time based on the position of the first number in the number sequence.

13. The vehicle mounted communication system according to claim 12, wherein the first number of vehicles is equal to a number included in the first set of numbers and the processing device is further configured to:

determine a position of the first number of vehicles in the number sequence and a position of the number included in the first set of numbers in the number sequence based on a distance between the first vehicle and the second vehicle and a distance between the second vehicle and a vehicle corresponding to the number included in the first set of numbers that is equal to the first number of vehicles.

14. The vehicle mounted communication system according to claim 8, wherein the processing device is further configured to:

identify, after the receiver receives the message from a vehicle other than the first vehicle, a second number of vehicles which are within the communication range of the communication system and have not received the message;

calculate a second count-down time based on the second number if the second number doesn't equal to zero, where the greater the second number the shorter the second count-down time; and if not all the second number of vehicles receive the message before the second count-down time ends, control the transmitter to broadcast the message when the second count-down time ends.

\* \* \* \* \*